United States Patent [19]  
Lehmberg

[11] 3,943,457  
[45] Mar. 9, 1976

[54] OPTICAL PULSE COMPRESSION AND SHAPING SYSTEM
[75] Inventor: Robert H. Lehmberg, Springfield, Va.
[73] Assignee: The United States of America as represented by the Secretary of the Navy, Washington, D.C.
[22] Filed: Oct. 16, 1974
[21] Appl. No.: 515,112

[52] U.S. Cl............... 330/4.3; 332/7.51; 350/162 R
[51] Int. Cl.² ........................................ G02B 27/38
[58] Field of Search................ 330/4.3; 332/7.51; 331/94.5 M, 94.5 C; 350/162 R, 168

[56] References Cited
UNITED STATES PATENTS
3,549,239  12/1970  Brienza et al. ................. 350/162 R OTHER PUBLICATIONS
Fisher et al., "Pulse Compression for . . . Laser Amplifier Chains," 5/15/74, pp. 468–470, Appl. Phys. Left., Vol. 24, No. 10.
Glenn et al., "Reserach Investigation of Ultrashort Laser Pulses . . . ," 3/69, 142 P, Rept. No. UACRL–H920506–10.
Andrews et al., "X-ray Laser Program . . . ," 6/30/74, 142 P, Rept. No. NRL–MR–2910.
Treacy, "Optical Pulse Compression with Diffraction Gratings," 9/69, pp. 454–458, I.R.C.C., Jour. of Quet. Elec., Vol. QR-5, No. 9.

Primary Examiner—Maynard R. Wilbur
Assistant Examiner—N. Moskowitz
Attorney, Agent, or Firm—R. S. Sciascia; Arthur L. Branning; Melvin L. Crane

[57] ABSTRACT
A laser system for producing short optical pulses with higher energy and controllable shape from a high power solid state laser system. The system includes two gratings at the output with an adjustable interferometer between the laser source and an amplifier element. Thus, the output pulse may be tailored to a particular shape.

8 Claims, 2 Drawing Figures

OPTICAL PULSE COMPRESSION AND SHAPING SYSTEM

BACKGROUND OF THE INVENTION

Heretofore high power solid state laser sources made use of a laser oscillator and pulse switch followed by a chain of rod and disc laser amplifiers. Such systems are limited by self focusing that occurs in the active material of the amplifier stage. Further, the outputs of these systems cannot be tailored to a specified shape which is desired in laser-plasma work. It is known that if a long radiation pulse is given a linear frequency modulation (chirp) before it is amplified, it can be compressed to shorter width with little energy loss by passing it through a suitable dispersive device at the output. Heretofore work has been performed to this end but has lacked the necessary flexibility and efficiency for compressing and shaping high power pulses.

Prior art pulse compression systems may be found in the following prior art. "Optical Pulse Compression with Diffraction Gratings", *IEEE Journal Quantum Electronics*, QE–5, p. 454, September 1969; "Chirped Optical Pulses" *Annals New York Academy of Science* 168, p. 400, February 1970. "Compression of Optical Pulses", *IEEE Journal Quantum Electronics*, QE–4, 262, May 1968. "Interferometer Utilisable pour La Compression d Impulsions Lumineuses Modulees en Frequency", *C.R. Academie des Sciences*, Paris, p. 258, 6112, June 1964.

SUMMARY OF THE INVENTION

The system which makes up this invention includes well-known elements arranged in a unique manner to produce short optical pulses with high energy and a controllable shape. An adjustable interferometer creates a radiation frequency dispersion which is adjustable. It converts a short time bandwidth limited pulse incident thereon into a longer pulse width with an adjustable frequency vs. time characteristic. The long pulse is then amplified by the laser amplifier. The output from the laser amplifier is directed through a grating pair which compresses and shapes the high energy pulse output.

DESCRIPTION OF THE SYSTEM

Figure 1:
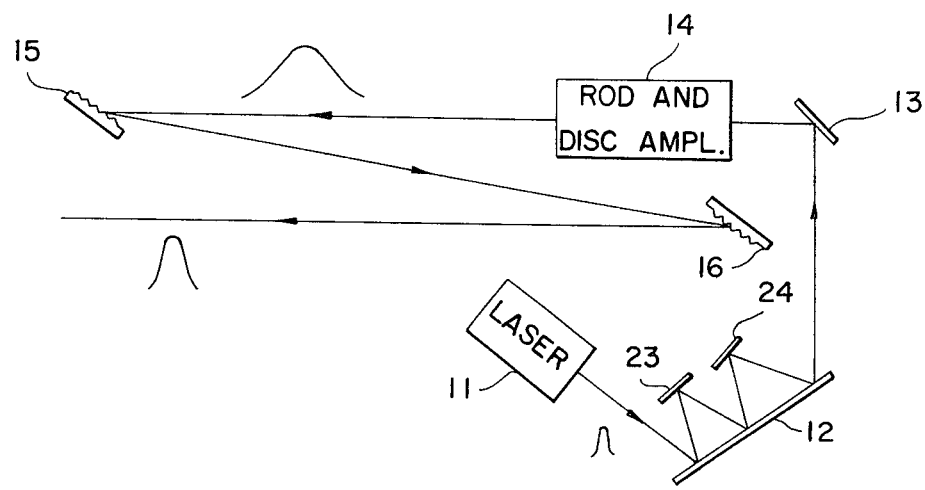
FIG. 1 illustrates a schematic diagram of the system.

Now referring to the drawing, there is shown by illustration a schematic of the system. The system includes an optical pulse source 11 such as a laser which produces an output having a width of about 20 picoseconds. The output is directed onto an interferometer 12 which creates a frequency dispersion such that the radiation emerging from the interferometer has a longer time width of about 200 picoseconds. The longer pulse output is directed onto a mirror 13 which reflects the radiation into a laser amplifier 14. The long pulse is then amplified by the laser amplifier to higher energies without experiencing prohibitively high peak intensities within the laser material. The output from the laser amplifier is directed onto a first grating 15 and from the first grating the radiation is directed onto a second grating 16 which reflects the radiation out into its desired path. In order to pass the high output energies produced by the laser amplifier, the gratings 15 and 16 should be large and very coarse reflection gratings of the echelle or echelon types.

Figure 2:
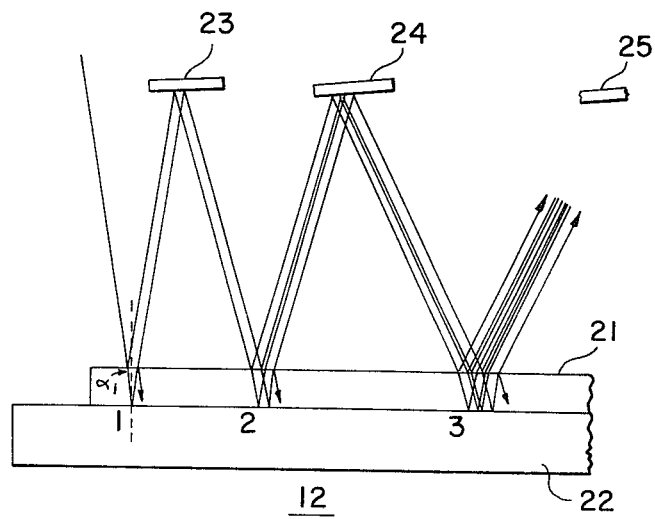
FIG. 2 illustrates in more detail the adjustable interferometer.

The interferometer is formed by a transparent dielectric film or slab 21 deposited onto a reflecting substrate 22. Thus, radiation incident on and reflected by the dielectric-film-air interface and the dielectric film-substrate interface creates a frequency dispersion as shown in FIG. 2. Associated with the dielectric film substrate are at least two mirrors 23, 24 which may have their angle of incidence adjusted independently of each other relative to the film-substrate. Therefore the dispersive angles may be adjusted as desired by arranging the different mirrors 23, 24, 25 relative to the film-substrate. Adjustment and enhancement of the dispersion may be made by arranging the mirrors such that the angle of the first mirror is less than or equal to the angle of the second, etc., such as $L_1 \leq L_2 \leq L_3 \leq L_n$. The length and chirp behavior of a pulse emerging from the interferometer depends upon the dispersion law and is therefore adjusted by a suitable arrangement of the mirrors angularly positioned relative to the dielectric film substrate.

The amplifier system comprises one or more stages of standard Nd: Glass or Ruby amplifiers in tandem.

In operation, the radiation pulse source produces an output having a wavelength pulse with an appropriate time ($t$) of about 20 pico-seconds. The radiation is directed onto the dielectric film coated substrate at an angle relative thereto. Some of the radiation beam is reflected by the film surface and some by the film-substrate interface onto the first mirror. The first mirror reflects the incident radiation back to the film substrate at an angle relative thereto. The radiation is reflected back and forth between the mirrors and the film-substrate for as many mirrors as there are in use. The mirrors are independently adjustable relative to the incident beam and may be set at any desired operable angle to produce the desired dispersion of the radiation beam. The radiation is finally reflected from the film-substrate with a much longer energy pulse of about $\Delta t \approx 200$ p sec. A mirror 13 in the output path of the interferometer reflects the radiation onto the rod and disc laser amplifier which amplifies the signal to high energies. The high energy output pulse of $\Delta t \approx 200$ p sec is directed onto the first grating, then to the second grating which compresses the pulse back to a shorter width of about $t = 20$ p sec. The second grating directs the output beam in a path to its useful purpose.

The system produces high energy outputs with short pulses and provides pulse shaping capability. These advantages are brought about through the use of a plurality of independently adjustable mirrors in the interferometer and the two gratings which reflect the output from the rod and disc amplifier.

In the event that high pulse energy is not needed, one can obtain pulse shaping capability by placing a pair of gratings in the radiation path between the interferometer and the laser amplifier rather than in the output as set forth above. Alternatively the pair of gratings could be positioned in the radiation path between the last rod amplifier and the adjacent disc amplifier stage in the laser amplifier section.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An optical pulse compression and shaping system; which comprises,
   an interferometer for receiving radiation from a radiation pulse source,
   a laser amplifier in the optical path of radiation emerging from said interferometer, and
   a pair of gratings in optical alignment with each other and the output radiation path of said laser amplifier.

2. An optical system as claimed in claim 1, in which, said interferometer includes a plurality of adjustable reflective surfaces in combination with a fixed frequency dispersion base means.

3. An optical system as claimed in claim 2, in which, said fixed frequency dispersion base means includes a substrate having a reflective surface, and a dielectric film on said reflective surface of said substrate with said dielectric film in optical alignment with said adjustable reflective surfaces.

4. An optical system as claimed in claim 1; in which said laser amplifier includes a laser rod and disc amplifier.

5. An optical system as claimed in claim 2; in which, said laser amplifier includes a laser rod and disc amplifier.

6. An optical system as claimed in claim 3; in which, said laser amplifier includes a laser rod and disc amplifier.

7. An optical system as claimed in claim 1; in which said pair of gratings are positioned in optical alignment between said interferometer and said laser amplifier.

8. An optical system as claimed in claim 6; in which, said pair of gratings are positioned in optical alignment within said laser amplifier between said rod and disc amplifiers.

* * * * *